US009596925B2

(12) United States Patent
Whitley et al.

(10) Patent No.: US 9,596,925 B2
(45) Date of Patent: Mar. 21, 2017

(54) LAMINATE LANYARDS AND METHODS FOR MAKING THE SAME (71) Applicant: Apple Inc., Cupertino, CA (US)

(72) Inventors: Crenshaw Whitley, San Francisco, CA (US); Craig Stanley, Santa Clara, CA (US); Matthew Rohrbach, San Francisco, CA (US); Trent Weber, San Francisco, CA (US); Robert Merrit, Sunnyvale, CA (US); Erik L. Wang, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 54 days.

(21) Appl. No.: 13/838,461

(22) Filed: Mar. 15, 2013

(65) Prior Publication Data

US 2014/0004763 A1 Jan. 2, 2014

Related U.S. Application Data (63) Continuation-in-part of application No. 13/631,269, filed on Sep. 28, 2012, now Pat. No. 9,016,534.

(Continued)

(51) Int. Cl.
*A45F 5/02* (2006.01)
*B32B 7/12* (2006.01)
(Continued)

(52) U.S. Cl.
CPC ............... *A45F 5/02* (2013.01); *A45F 5/00* (2013.01); *B32B 5/028* (2013.01); *B32B 5/26* (2013.01);
(Continued)

(58) Field of Classification Search
None
See application file for complete search history.

(56) References Cited

U.S. PATENT DOCUMENTS 2,203,822 A * 6/1940 Hyman ................... 428/127
4,937,920 A   7/1990 Tsai
(Continued)

FOREIGN PATENT DOCUMENTS

GB   2300833   11/1996
TW   386942    4/2000
(Continued)

OTHER PUBLICATIONS

International Search Report, PCT Application No. PCT/US2013/045934, 3 pages, Oct. 1, 2013.

*Primary Examiner* — Jennifer Chriss
*Assistant Examiner* — Shawnda McKinnon
(74) *Attorney, Agent, or Firm* — Sterne, Kessler, Goldstein & Fox P.L.L.C.

(57) ABSTRACT

Laminate lanyards and methods for making the same are disclosed. The laminate lanyards may include a head formed from a reinforcing loop of yarn incorporated within a scrim. The head can be coupled to the head section of a body, which also includes a main section that forms the loop of the laminate lanyard. A gusset can be coupled to ends of the main section of the body to couple the two ends of the body together and facilitate opening and closing of the loop of the laminate lanyard. A slider may also be included in laminate lanyard for adjusting the size of the loop.

10 Claims, 7 Drawing Sheets

Related U.S. Application Data (60) Provisional application No. 61/665,108, filed on Jun. 27, 2012.

(51) Int. Cl.
    *B32B 5/02*        (2006.01)
    *B32B 5/26*        (2006.01)
    *A45F 5/00*       (2006.01)

(52) U.S. Cl.
 CPC .......... *B32B 7/12* (2013.01); *A45F 2005/006* (2013.01); *A45F 2200/055* (2013.01); *A45F 2200/0508* (2013.01); *A45F 2200/0516* (2013.01); *A45F 2200/0525* (2013.01); *A45F 2200/0533* (2013.01); *A45F 2200/0558* (2013.01); *B32B 2262/0269* (2013.01); *B32B 2262/0284* (2013.01); *B32B 2262/103* (2013.01); *B32B 2519/00* (2013.01); *Y10T 428/31504* (2015.04); *Y10T 428/31678* (2015.04); *Y10T 428/31725* (2015.04); *Y10T 428/31786* (2015.04); *Y10T 442/10* (2015.04)

(56) References Cited

U.S. PATENT DOCUMENTS

| | | | |
|---|---|---|---|
| 5,190,802 A | 3/1993 | Pilato | |
| 5,635,288 A * | 6/1997 | Park | .............................. 428/105 |
| 6,503,855 B1 | 1/2003 | Menzies et al. | |
| 2004/0094592 A1 | 5/2004 | Brown | |
| 2007/0166495 A1* | 7/2007 | Sellis et al. | .................. 428/36.1 |

FOREIGN PATENT DOCUMENTS

| | | |
|---|---|---|
| TW | 412952 | 11/2000 |
| WO | WO01/94108 | 12/2001 |

\* cited by examiner

LAMINATE LANYARDS AND METHODS FOR MAKING THE SAME

CROSS-REFERENCE TO RELATED APPLICATION

This application is a continuation-in-part of U.S. patent application Ser. No. 13/631,269 filed Sep. 28, 2012, which claims the benefit under Title 35, United States Code §119 (e) to U.S. Provisional Patent Application No. 61/665,108 filed on Jun. 27, 2012, the disclosures of which are incorporated by reference herein in their entirety.

BACKGROUND

Lanyards are commonly used for holding small personal effects such as keys, access badges, and small electronic devices. Lanyards may include a loop of material that is meant to be worn around a person's neck or wrist and a mechanism for connecting the lanyard to an object.

SUMMARY

Laminate lanyards and methods for making the same are disclosed. Laminate lanyards can include a body section, which can form a loop, and a head section with an opening for attaching the laminate lanyard to an object. The body and head of the laminate lanyard may include several layers of material coupled together along with one or more adhesive layers. Additionally, a fiber loop may be incorporated around the opening and within the head to provide reinforcement for the head and opening, as those portions of the laminate lanyard may be subject to various stresses during normal use. A gusset can be included to facilitate coupling of the body portion of the laminate lanyard to the head portion. In some embodiments, a slider may be provided for adjusting the dimensions of the loop created by the body section of the laminate lanyard.

BRIEF DESCRIPTION OF THE DRAWINGS

The above and other aspects of the invention, its nature, and various features will become more apparent upon consideration of the following detailed description, taken in conjunction with the accompanying drawings, in which like reference characters may refer to like parts throughout, and in which.

DETAILED DESCRIPTION

Figure 1:
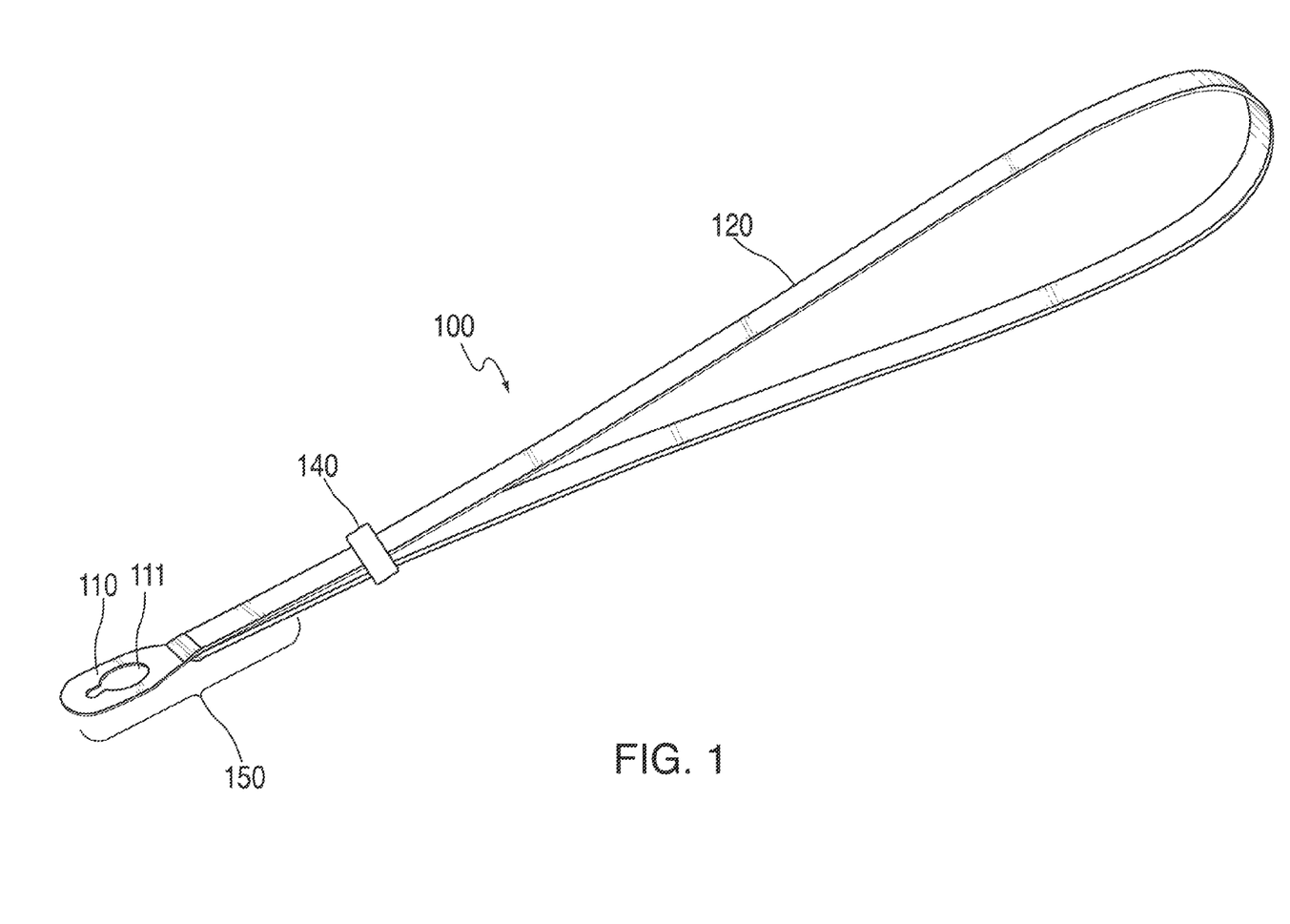
FIG. 1 shows a perspective view of a laminate lanyard in accordance with various embodiments.

FIG. 1 shows a perspective view of a laminate lanyard 100 in accordance with various embodiments. Laminate lanyard 100 can include body 120, head 110, and slider 140. Head 110 may include opening 111 for attaching laminate lanyard 100 to an object, and body 120 may be coupled to head 110 at transition region 150.

Body 120 can include a number of layers of material (e.g., polyurethanes, microfibers, and woven fabric), which can be pressed and held together with one or more layers of adhesive. In some embodiments, body 120 may be assembled as one long, flat strip and then folded over and coupled to head 110 at transition region 150 to form the loop of laminate lanyard 100. Body 120 may include a head section at either end of a main section. According to some embodiments, the head sections can be integrally formed with body 120 and have the same dimensions as head 110. The head sections of body 120 may only include a single layer of material (e.g., a woven fabric).

Head 110 may include a number of material layers, which may be different from the layers of material that are included in body 120. Head 110 can also include a loop of high-strength fiber forming a fiber layer for reinforcing the thin areas surrounding opening 111. In some embodiments, the fiber may be a liquid-crystal fiber such as Vectran®. In other embodiments, any suitable fiber, including Kevlar (or other aramid or para-aramid fibers), xylow, nitinol, steel, or other natural, synthetic, and/or metallic fibers may be used in addition to, or as an alternative to, Vectran®. It is to be understood that a "fiber" can include any piece of yarn including a plurality of individual fibers. Additionally, a fiber layer which can be formed from a plurality of synthetic or organic strands of fiber which can be woven together. According to some embodiments, head 110 may be stamped or cut out from a scrim sheet for incorporation into laminate lanyard 100. Scrim sheets will be discussed in more detail below with respect to FIGS. 3 and 4.

Head 110 may be coupled to body 120 within transition region 150. Transition region 150 can include one or more layers of body 120 overlapping at least a portion of head 110. For example, head 110 may include a transition section that is pressed between end portions of the main section of body 120. Additionally, a gusset can be incorporated into laminate lanyard 100 to reinforce transition region 150 and to provide a hinge that facilitates opening and closing of the loop of laminate lanyard 100. The gusset may be incorporated into transition region 150 very close to, or abutting, the end of the transition section of head 110.

Slider 140 may be any ring-shaped object configured to slide up and down body 120 while providing enough friction so as to be suitable for adjusting the size of the loop of laminated lanyard 100.

Figure 2:
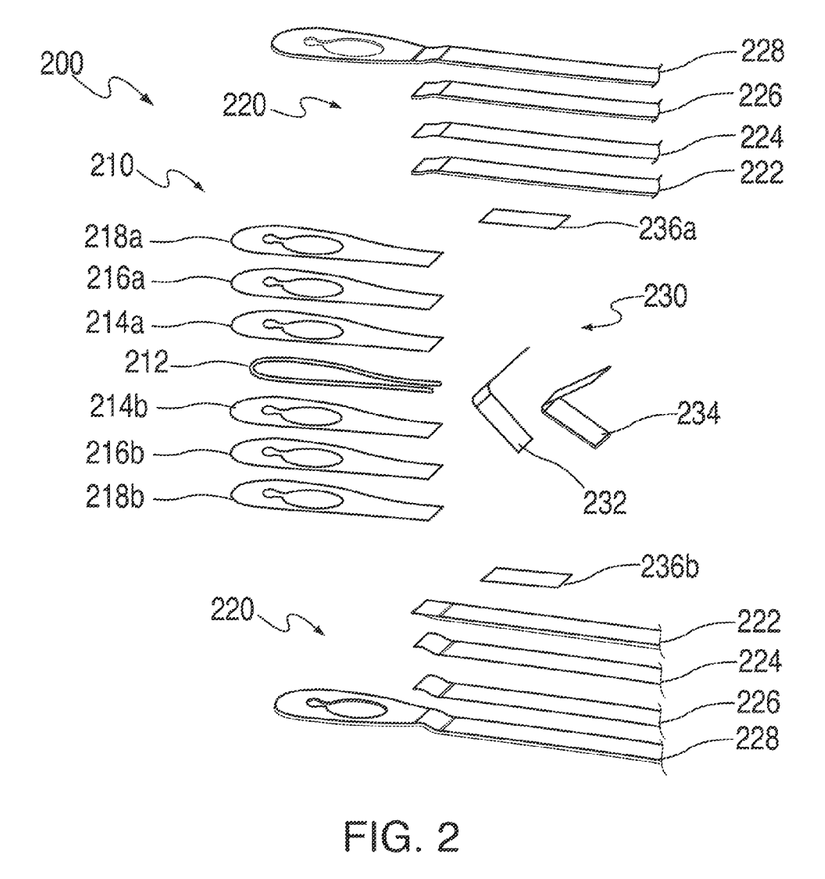
FIG. 2 shows an exploded view of the junction between a head section and a body section of a laminate lanyard in accordance with various embodiments.

FIG. 2 shows an exploded view of a portion of laminate lanyard 200 in accordance with various embodiments. Laminate lanyard 200 may correspond to, for example, the portion of laminate lanyard 100 of FIG. 1 including head 110, transition region 150, and the proximate portions of the main section of body 120. Laminate lanyard 200 may include head 210, body 220, and gusset 230.

Head 210 can be assembled by stacking and coupling together a number of individual material layers on either side of a loop of fiber forming fiber layer 212. In an exemplary embodiment, fiber layer 212 can be an untwisted Vectran® yarn, which exhibits high strength and low elasticity. However, any suitable fiber may be used to reinforce head 210, including Kevlar (or other aramid or para-aramid fibers), xylow, nitinol, steel, or other natural, synthetic, and/or metallic fibers, or combinations of the above fibers.

The material layers of head 210 may include inner scrim adhesive layers 214a and 214b, scrim layers 216a and 216b, and outer scrim adhesive layers 218*a* and 218*b*. Inner scrim adhesive layers 214*a* and 214*b* can be any suitable material that promotes adhesion between fiber layer 212 and scrim layers 216*a* and 216*b*. According to some embodiments, inner scrim adhesive layers 214*a* and 214*b* can include a thermoplastic adhesive. In other embodiments, however, any suitable adhesive, such as an epoxy or glue may be used.

Scrim layers 216*a* and 216*b* may, along with fiber layer 212, provide reinforcement for head 210 of laminate lanyard 200. Thus, a relatively strong material, such as polyethylene terephthalate ("PET") may be incorporated into scrim layers 216*a* and 216*b*. According to some other embodiments, scrim layers 216*a* and 216*b* may include other strong materials, including woven fabrics (e.g., Vectran® fabrics), polymers, and/or metals (e.g., aluminum, titanium, or steel).

Outer scrim adhesive layers 218*a* and 218*b* can be any suitable material that promotes adhesion between scrim layers 216*a* and outer cover layer 228 of body 220. According to some embodiments, outer scrim adhesive layers 218*a* and 218*b* can include a thermoplastic adhesive (e.g., the same or a different thermoplastic adhesive used in inner scrim adhesive layers 214*a* and 214*b*). In other embodiments, however, any suitable adhesive, such as an epoxy or glue may be used.

Body 220, like head 210, can also be assembled by stacking and coupling together a number of individual material layers. According to some embodiments, body 220 can include an inner cover layer 222, inner adhesive layer 224, outer adhesive layer 226, and outer cover layer 228.

Outer cover layer 228 can form one of the outer surfaces of laminate lanyard 200, so it may be beneficial to choose a material that is visually and/or tactilely appealing. In some embodiments, outer cover layer 228 may be a woven fabric. For example, outer cover layer 228 may be woven from Vectran®, or any other suitable yarn. In embodiments employing Vectran®, the inner surface of outer cover layer 228 may further be pre-coated with an outer adhesive layer 226 (e.g., a cross-linking polyurethane) to promote adhesion between outer cover layer 228 and inner adhesive layer 224.

Inner adhesive layer 224 can be any suitable material that promotes adhesion between outer cover layer 228 and inner cover layer 222. According to some embodiments, inner adhesive layer 224 can include a thermoplastic adhesive. In other embodiments, however, any suitable adhesive, such as an epoxy or glue may be used.

Inner cover layer 222 can form an outer surface of laminate lanyard 200 opposing outer cover layer 228. According to some embodiments, inner cover layer 222 can be a microfiber material. However, in other embodiments, inner cover layer 222 may include any visually and/or tactilely appealing material such as a woven fabric or felt.

According to some embodiments, a gusset 230 may be incorporated into laminate lanyard 200 between portions of the ends of the main section of body 220. Because head 210 may be preassembled before being incorporated into laminate lanyard 200, layers of head 210 may not overlap any portion of gusset 230. Rather, gusset 230 may be placed between portions of body 220 close to or abutting head 210. Gusset 230 may be a bent or hinged member that can hold the ends of body 220 together and provide a mechanism for opening and closing the loop of laminate lanyard 200.

Gusset 230 may be formed from a base layer 234 and an adhesive layer 232. Additionally, gusset 230 can be coupled to body 220 with adhesive members 236*a* and 236*b*. Base layer 234 may include a flexible, strong material that couples together the two ends of body 220 and facilitates opening and closing of the loop of laminate lanyard 200. According to some embodiments, base layer 234 can be a woven fabric (e.g., a fabric woven from a material such as Vectran® yarn). In those embodiments, base layer 234 may be pre-coated with an adhesive layer 232 (e.g., a cross-linking polyurethane) to promote adhesion between base layer 234 and adhesive members 236*a* and 236*b*.

Adhesive members 236*a* and 236*b* can be any suitable material that promotes adhesion between base layer 234 and/or adhesive layer 232 and inner cover layer 222 of body 220. According to some embodiments, adhesive members 236*a* and 236*b* can include a thermoplastic adhesive. In other embodiments, however, any suitable adhesive, such as an epoxy or glue may be used.

Laminate lanyard 200 can be used for holding small personal effects, including but not limited to keys, badges, electronic media players, cellular telephones, cameras, video recorders, wallets, credit cards, books, and any combination thereof. Laminate lanyard 200 can also be used to hold together components, such as components of an electronic device. Laminate lanyard 200 can also be used as a functional apparatus for suspending materials such as paintings, mirrors, photographs, light fixtures, etc. The aforementioned examples are merely illustrative.

Furthermore, head 210 and body 220 are not limited to being components of laminate lanyard 200. According to some embodiments, head 210 and body 220 can be materials used, alone or in combination, for clothing such as footwear, outwear, hats, drawstrings, belts, shirts, pants, etc. Head 210 and body 220 can also be materials used, alone or in combination, for furniture, carpets, rugs, floor mats, and bedding. In such embodiments, as described below with respect to FIGS. 7 and 8, for example, the layers forming head 210 and body 220 can have any suitable shape, size, and/or geometry.

Figure 3:
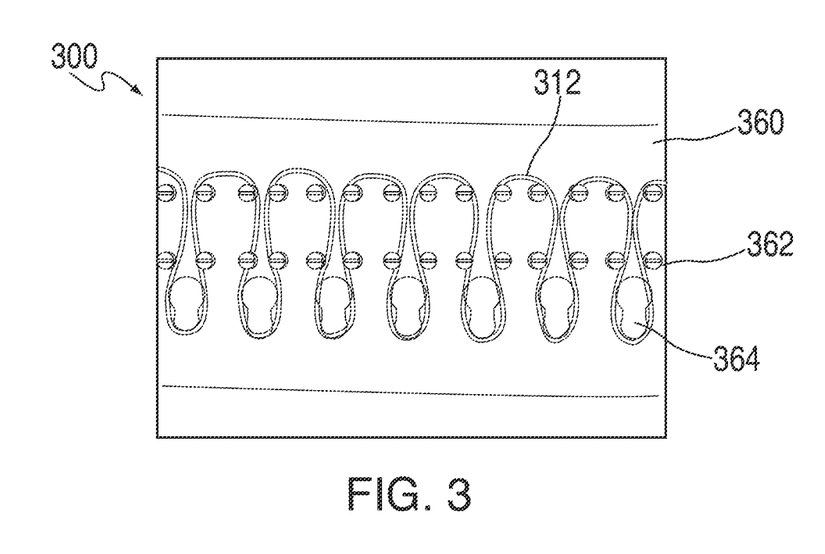
FIG. 3 shows a top view of a portion of a mechanism for forming a scrim sheet including loops of fiber in accordance with various embodiments.

FIG. 3 shows a top view of a portion of a mechanism 300 for forming a scrim sheet including loops of fiber 312 in accordance with various embodiments. Mechanism 300 may include a working surface 360, alignment posts 362, and head posts 364. Alignment posts 362 and head posts 364 may be spring loaded, such that the posts can be compressed to the level of working surface 360 under applied pressure.

A length of fiber layer 312 (e.g., Vectran® fiber) may be threaded through alignment posts 362 and head posts 364 with sufficient tension to suspend fiber layer 312 above working surface 360. Material layers can be laid under and over fiber layer 312 and pressed to form a scrim sheet. For example, a first set of material layers (e.g., layers 214*a*, 216*a*, and 218*a* of FIG. 2) can be placed on working surface 360 prior to fiber layer 312 being threaded through alignment posts 362 and head posts 364. Similarly, a second set of material layers (e.g., layers 214*b*, 216*b*, and 218*b* of FIG. 2) can be placed upon the threaded fiber. Once the material layers are in place, pressure and/or heat may be applied to working surface 360 of mechanism 300 to couple together the material layers and fiber layer 312. Accordingly, when the material layers are pressed together, fiber layer 312 can be fully encased within the material layers, thus forming the full scrim sheet.

Alignment holes can be precut in the material layers for properly aligning the material layers in mechanism 300. Proper alignment of the material layers may be beneficial if, for example, any of the material layers have anisotropic strength and/or elasticity properties. In this manner, the scrim sheets produced by mechanism 300 in each run can be consistently strong in the critical directions.

In some embodiments, the material layers may be heated in order to promote adhesion between the layers. In some embodiments, heat may be applied by elements included within mechanism 300 (e.g., by heating elements that elevate the temperature of working surface 360). In other embodiments, heat can be introduced from an external source (e.g., a heat plate used to apply pressure to the material layers and working surface 360 or an oven in which mechanism 300 is placed).

Figure 4:
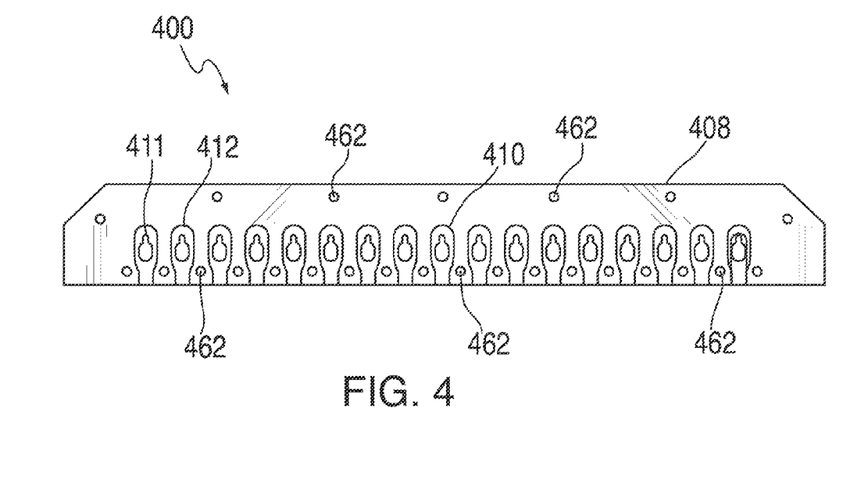
FIG. 4 shows a top plan view of a scrim sheet in accordance with various embodiments.

FIG. 4 shows a top plan view of a scrim sheet 400 in accordance with various embodiments. Scrim sheet 400 can include scrim 408, which may include several material layers coupled together with pressure and/or heat, and fiber layer 412. Scrim sheet 400 can include alignment holes 462, which can correspond to alignment posts 362 of mechanism 300 as depicted in FIG. 3. Alignment holes 462 can, along with alignment posts 362, ensure that identical scrim sheets 400 are produced over any suitable number of runs.

Individual heads 410 can be separated from scrim sheet 400 using any suitable method (e.g., sawing, die cutting, or stamping). Additionally, openings 411 can be provided for each head 410. In some embodiments, openings 411 may be formed at the same time as heads 410 are separated from scrim sheet 400 (e.g., in the same die-cutting process). In other embodiments, openings 411 may be formed before or after heads 410 are separated from scrim sheet 400.

Figure 5:
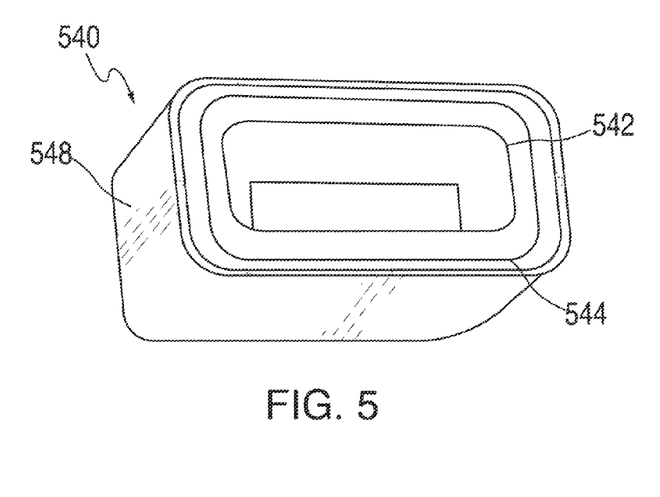
FIG. 5 shows a perspective view of slider in accordance with various embodiments.

FIG. 5 shows a perspective view of slider 540 in accordance with various embodiments. Slider 540 may include outer cover layer 548, inner cover layer 542, and adhesive layer 544. In some embodiments, outer cover layer 548 may include the same material(s) as outer cover layer 228 of FIG. 2. Thus, in some embodiments, outer cover layer 548 may be a woven fabric (e.g., a fabric woven from Vectran® yarn).

In some embodiments, inner cover layer 542 may be formed from the same material(s) as inner cover layer 222 of FIG. 2. Thus, inner cover layer 542 may be, for example, a microfiber material. Adhesive layer 544 can be any suitable material that promotes adhesion between outer cover layer 548 and inner cover layer 542 of slider 540. According to some embodiments, adhesive layer 544 can include a thermoplastic adhesive. In other embodiments, in which outer cover layer 548 is a woven fabric incorporating Vectran® yarn, outer cover layer 548 can be pre-coated with an additional adhesive layer (e.g., a cross-linking polyurethane). In some embodiments, slider 540 may be cut from a long roll of the outer cover layer/adhesive layer/inner cover layer stack.

Figure 6:
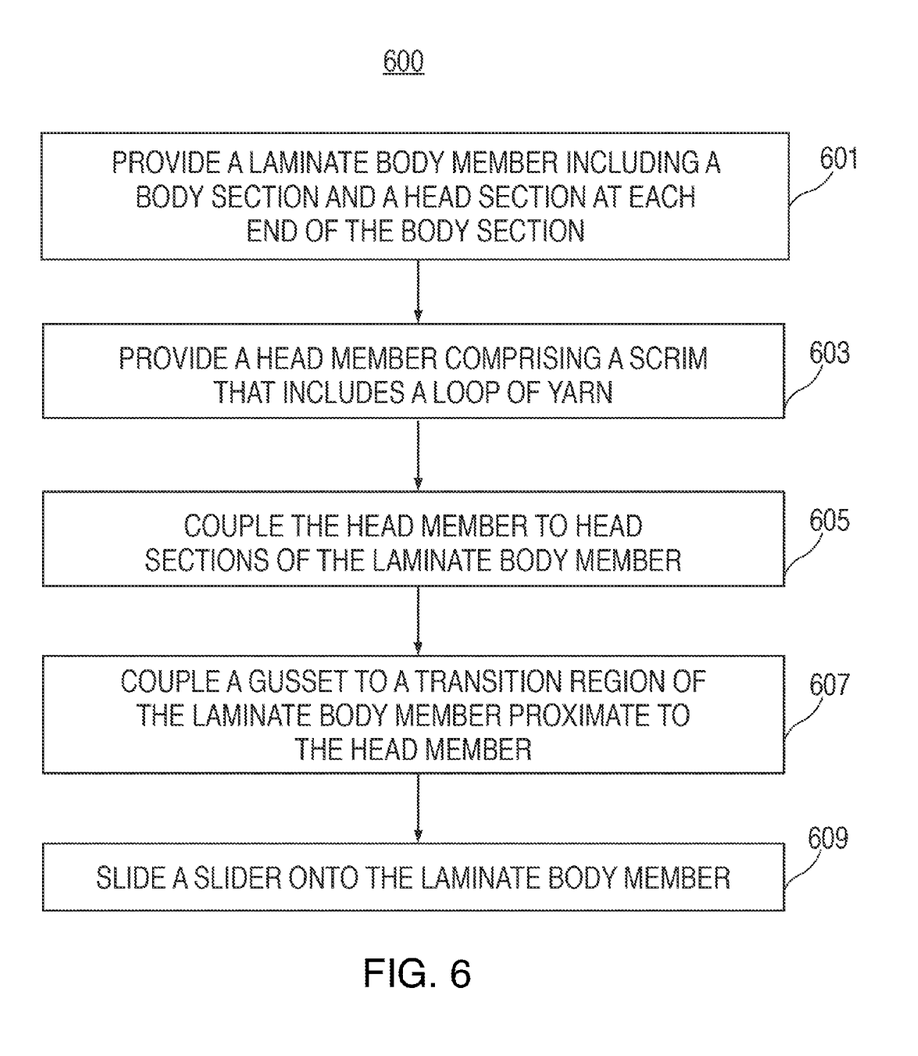
FIG. 6 is a flowchart of an illustrative process for forming a laminate lanyard in accordance with various embodiments.

FIG. 6 is a flowchart of an illustrative process 600 for forming a laminate lanyard in accordance with various embodiments. At step 601, a laminate body member can be provided. The laminate body member can be a laminate structure formed from several layers. For example, the laminate body member may be body 220 of FIG. 2, which includes an inner cover layer 222, inner adhesive layer 224, and outer cover layer 228. According to embodiments in which the outer cover layer is formed from Vectran®, the laminate body member may be further pre-coated with an outer adhesive layer (e.g., outer adhesive layer 226 of FIG. 2). The various layers of the laminate body member may be coupled together using conventional adhesives, and/or the application of pressure and/or heat.

At step 603, a head member can be provided. The head member may include a scrim that includes a loop of yarn. For example the head member may be similar to head 210 of FIG. 2, which includes fiber layer loop 212, inner scrim adhesive layers 214*a* and 214*b*, scrim layers 216*a* and 216*b*, and outer scrim adhesive layers 218*a* and 218*b*. The adhesive layers may include a thermoplastic adhesive, epoxy, glue, and/or any other suitable adhesive. The various layers of the laminate body member may be coupled together using the adhesives, and/or the application of pressure and/or heat. A hole can be formed within the area defined by the fiber layer loop to facilitate coupling the laminate lanyard to an object.

According to some embodiments, the head member can be fabricated by placing a first material stack, including an inner scrim adhesive layer, a scrim layer, and an outer scrim adhesive layer, upon a mechanism that includes head posts and alignment posts (e.g., head posts 364 and alignment posts 362 of FIG. 3). The layers of the material stack can include alignment holes (e.g., alignment holes 462 of FIG. 4) corresponding to the alignment posts such that the material stack can be placed on a working surface of the mechanism (e.g., working surface 360 of FIG. 3). The alignment posts can engage the alignment holes to restrict lateral movement of the material stack with respect to the working surface.

A length of fiber (e.g., length of fiber 312) can be threaded through the alignment posts and head posts with sufficient tension to suspend it above the working surface and the first material stack. The length of fiber may be threaded manually or automatically (e.g., with the aid of a threading machine).

A second material stack can be layered above the length of fiber. The second material stack may be substantially identical to the first material stack. Accordingly the second material stack can include an inner scrim adhesive layer, a scrim layer, an outer scrim adhesive layer, and alignment holes. The first and second material stacks and the length of fiber can then be coupled together by being pressed together and/or being exposed to heat. According to some embodiments, the alignment posts and the head posts can be spring loaded such that they can be compressed to the level of the working surface with applied pressure (e.g., the pressure applied to couple together the first and second material stacks and the length of fiber).

At step 605, the head member can be coupled to head sections of the laminate body member. The head member may be coupled to the head sections of the laminate body member using adhesive layers (e.g., outer scrim adhesive layers 218*a* and 218*b*). The outer scrim adhesive layers may be formed from any suitable adhesive, including a thermoplastic adhesive, an epoxy, and/or a glue. In embodiments in which the head sections of the laminate body member are formed from Vectran®, a layer of a cross-linking polyurethane may be included between the laminate body member and the outer scrim adhesive layers.

At step 607, a gusset can be coupled to a transition region of the laminate body proximate to the head member. The gusset may be similar to gusset 230 of FIG. 2, which includes a base layer 234 and an adhesive layer 232. The gusset may be bent into a V-shape such that the point, or hinge, of the gusset is close to or abuts the head. The surfaces of the gusset that extend away from the hinge can be coupled to the laminate body with the adhesive layer or with additional adhesive members (e.g., adhesive members 236*a* and 236*b* of FIG. 2).

At step 609, a slider can be slid onto the laminate body member. The slider can be a ring-shaped object that can slide up and down the length of the laminate body member. For example, the slider may be similar to slider 540 of FIG. 5, which includes an outer cover layer 548, an adhesive layer 544, and an inner cover layer 542. In some embodiments, the slider can be cut from a long roll of the outer cover layer, adhesive layer, inner cover layer stack.

It should be understood that the processes described above are merely illustrative. Any of the steps may be removed, modified, or combined, and any additional steps may be added or steps may be performed in different orders, without departing from the scope of the invention.

Figure 7:
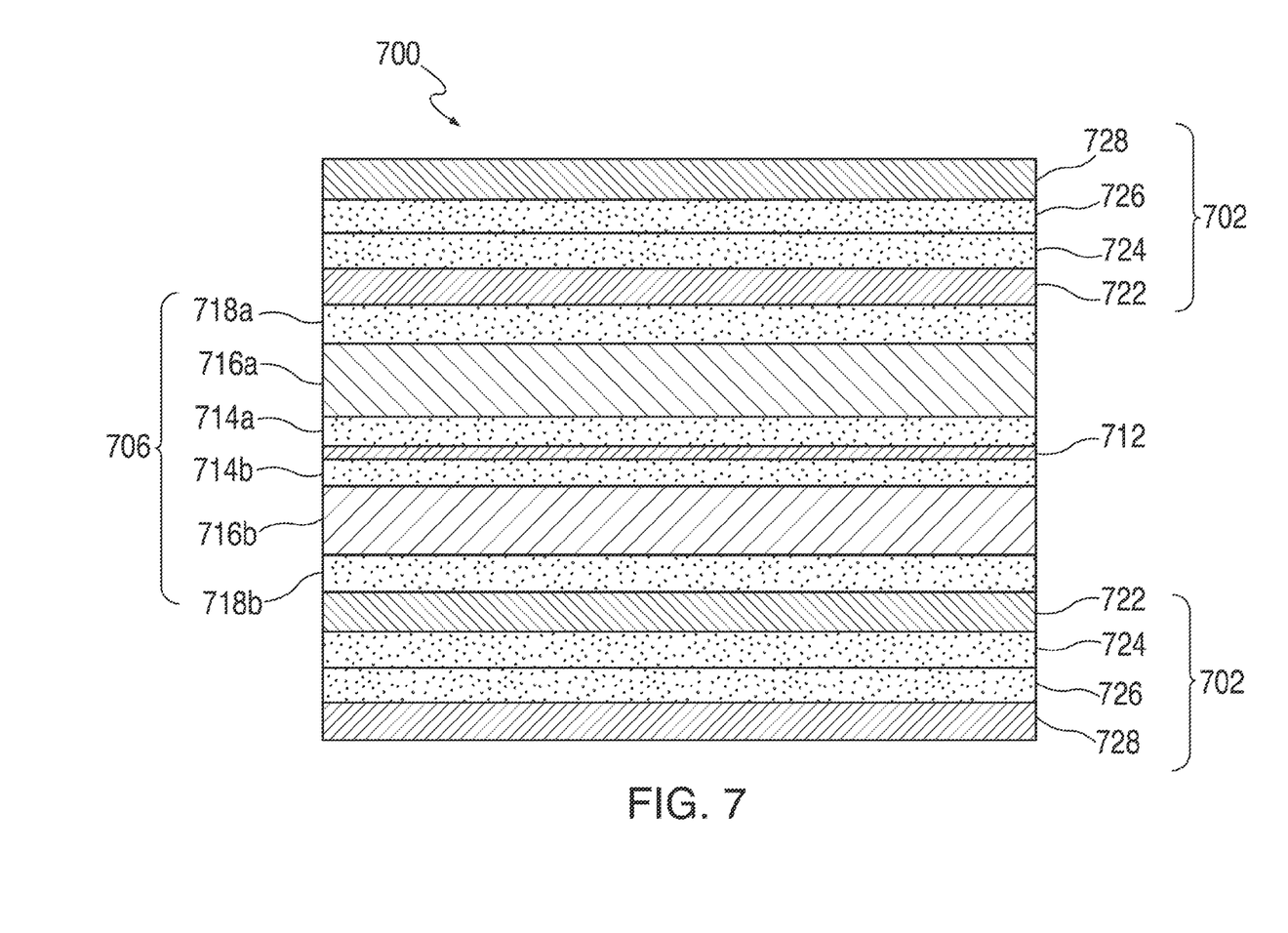
FIG. 7 shows a cross sectional view of a laminate material in accordance with various embodiments.

FIG. 7 shows a cross sectional view of laminate material 700 in accordance with various embodiments. Laminate material 700 may include top layer 702, bottom layer 704, and inner layer 706, which may correspond to head 210 and body 220 of FIG. 2. Top layer 702 may be composed of a variety of layers and can be assembled by stacking and coupling together a number of individual material layers. According to some embodiments, top layer 702 can include inner cover layer 722, inner adhesive layer 724, outer adhesive layer 726, and outer cover layer 728.

Outer cover layer 728 can form one of the outer surfaces of laminate material 700. In some embodiments, outer cover layer 728 may be a woven fabric, such as Vectron®, or any other suitable yarn. In other embodiments, outer cover layer 728 may be formed of any suitable material such that outer cover layer 728 is visually and/or tactilely appealing. In addition to the previously mentioned embodiments, outer cover layer 728 may be pre-coated with outer adhesive layer 726 using any suitable coupling mechanism to promote adhesion between inner adhesive layer 724 and outer cover layer 728. Outer adhesive layer 726 and cover layer 728 may, in certain embodiments, be similar to outer adhesive layer 226 and outer cover layer 228 of FIG. 2.

Inner adhesive layer 724 can be any suitable material that promotes adhesion between inner cover layer 722 and outer cover layer 728. According to some embodiments, inner adhesive layer 724 can include a thermoplastic adhesive. In other embodiments, however, any suitable adhesive, such as an epoxy or glue may be used. In some embodiments, inner cover layer 722 and inner adhesive layer 724 may be substantially similar to inner cover layer 222 and inner adhesive layer 224 of FIG. 2.

Laminate material 700 may also include bottom layer 704. Bottom layer 704 may be composed a variety of layers and can be assembled by stacking and coupling together of a number of individual material layers. Bottom layer 704 may be formed of substantially the same materials and layers as top layer 702. In some embodiments, bottom layer 704 can include additional layers, or fewer layers as compared to top layer 702. In still further embodiments, bottom layer 704 may not be present and top layer 702 may wrap around inner layer 706 (e.g., forming a loop).

Inner layer 706 can be assembled by stacking and coupling together a number of individual material layers. The stacking and coupling together of individual layers can occur on either side of a piece of a fiber layer, such as fiber layer 712. Fiber layer 712 may be similar to fiber layer 212 of FIG. 2. Fiber layer 712 can also be formed of a plurality of individual fibers. In a particular embodiment, fiber layer 712 can be formed of untwisted Vectran® yarn. In other embodiments, however, fiber layer 712 can be any suitable twisted or untwisted fiber.

Inner layer 706 can also include inner scrim adhesive layers 714a and 714b. Inner scrim adhesive layers 714a and 714b may be similar to inner scrim adhesive layers 214a and 214b of FIG. 2. In other embodiments, inner scrim adhesive layers 714a and 714b can be any suitable material that promotes adhesion between fiber layer 712 and scrim layers 716a and 716b. According to some embodiments, inner scrim adhesive layers 714a and 714b can include a thermoplastic adhesive. In other embodiments, however, any suitable adhesive, such as an epoxy or glue may be used.

Inner layer 706 may also include scrim layers 716a and 716b. Scrim layers 716a and 716b of laminate material 700 may be substantially similar to scrim layers 216a and 216b of laminate lanyard 200 of FIG. 2. Scrim layers 716a and 716b may, along with fiber layer 712, provide reinforcement for laminate material 700. Thus, a relatively strong material, such as polyethylene terephthalate ("PET") may be incorporated into scrim layers 716a and 716b. According to some embodiments, scim layers 716a and 716b may include other strong materials, including, but not limited to, woven fabrics (e.g., Vectran® fabrics), polymers, and/or metals (e.g., aluminum, titanium, or steel).

Inner layer 706 may also include outer scrim adhesive layers 718a and 718b. Outer scrim adhesive layers 718a and 718b may be substantially similar to outer scrim adhesive layers 218a and 218b of laminate lanyard 200 of FIG. 2. Outer scrim adhesive layer 718a can be any suitable material that promotes adhesion between scrim layers 716a and outer cover 728 of top layer 702. In some embodiments, outer scrim adhesive layer 718b can be any suitable material that promotes adhesion between scrim layer 716b and outer cover 728 of bottom layer 704. According to some embodiments, outer scrim adhesive layer 718a and 718b can include a thermoplastic adhesive (e.g., the same or a different thermoplastic adhesive used in inner scrim adhesive layers 714a and 714b). In other embodiments, however, any suitable adhesive, such as an epoxy or glue, may be used.

Figure 8:
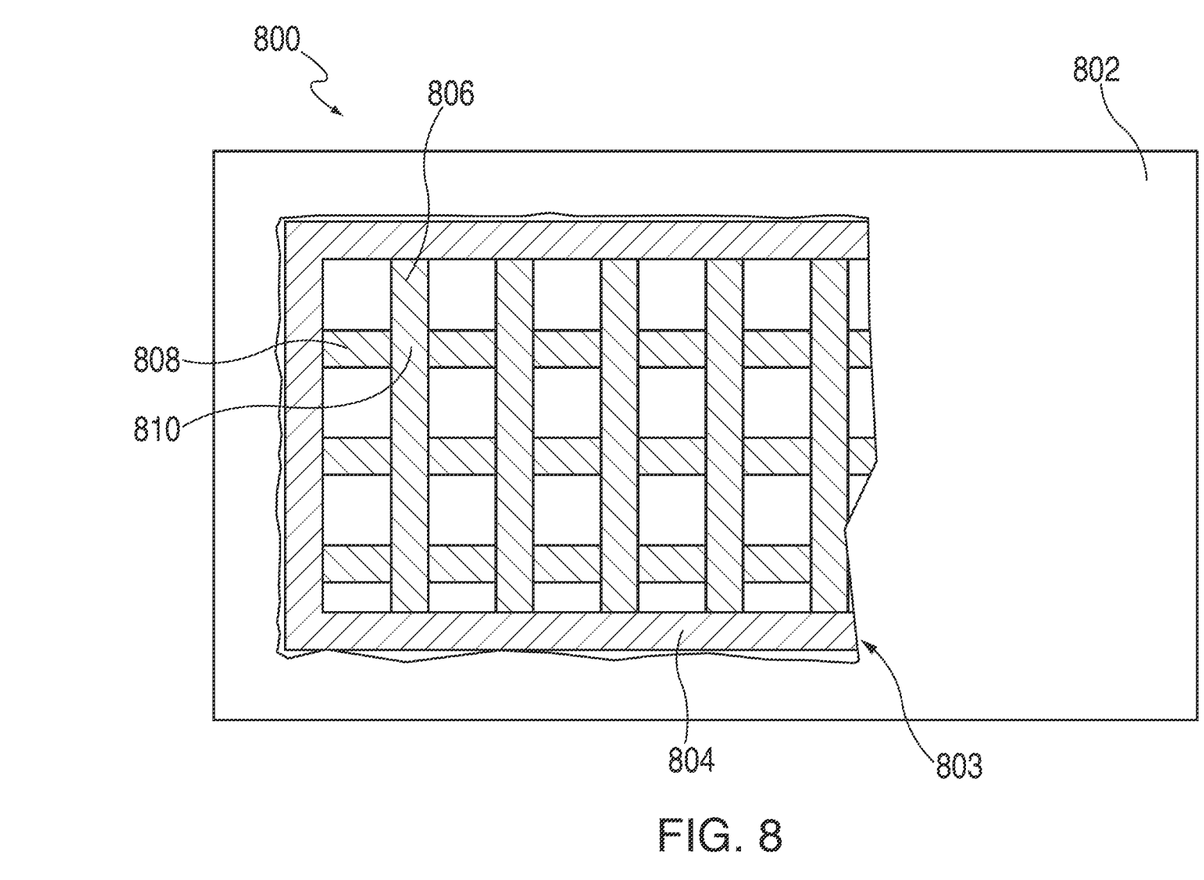
FIG. 8 shows a top view of a laminate material in accordance with various embodiments.

FIG. 8 shows a top cut away view of a laminate material 800 in accordance with various embodiments. Laminate material 800 can correspond to laminate material 700 of FIG. 7, for example.

Laminate material 800 can include body 802, which may be assembled by stacking and coupling together a number of individual layers. The individual layers used to form body 802 can include at least some of the layers used to form laminate material 700. If desired, additional layers can be included to form body 802. Similarly, one or more fewer layers can be included to form body 802. Body 802 can take any suitable shape including but not limited to a square, a rectangle, a circle, a pentagon, a hexagon, or any other polygon. Additionally, body 802 can take the shape of an L-shape, a frame (e.g., a rectangle with a smaller rectangle cut away from the inner portion), a strip, a loop, or any other shape as desired.

Laminate material 800 can include scrim layer 804. According to various embodiments, scrim layer 804 can have the same shape and dimensions as body layer 802, or scrim layer 804 can be any suitable shape including, but not limited to, a circle, a pentagon, a hexagon, or any other polygon. Additionally, scrim layer 804 can take the shape of an L-shape, a frame (e.g., a rectangle with a smaller rectangle cut away from the inner portion), a strip, a loop, or any other suitable shape. Scrim layer 804 can line the perimeter of body 802 or in other embodiments, can be formed slightly inward from the perimeter of body 802. In other embodiments, scrim layer 804 need not be present.

As shown in FIG. 8, laminate material 800 can include one or more vertical scrim strips 806 and horizontal scrim strips 808. Vertical scrim strips 806 and horizontal scrim strips 808 can be of any shape, size, or thickness. Any suitable number of vertical scrim strips can also be included (e.g., 2, 10, 20, 200).

Vertical scrim strips 806 and horizontal scrim strips 808 can, in some embodiments, be arranged such that the two form a woven pattern. In at least one embodiment, vertical scrim strips 806 can be aligned consecutively along a horizontal direction of laminate material 800. Horizontal scrim strips 808 can subsequently be woven through vertical scrim strips 806 such that horizontal scrim strips 808 oscillate from being beneath to above the corresponding vertical scrim strips 806 at intersection points 810. In other embodiments, any suitable woven pattern may be formed. In further embodiments, vertical scrim strips 806 and horizontal scrim strips 808 need not be woven. For example, horizontal scrim strips 808 and vertical scrim strips 806 may be integrally formed in a diagonal manner, as concentric circles, concentric squares, concentric rectangles, or in any combination thereof.

Smaller pieces of laminate material can be cut out of laminate material 800. In this way, one can reduce production costs by forming one large piece of laminate material 800 and subsequently produce any desired size or shape from material 800.

A laminate material, such as laminate material 800, can be used for a variety of purposes. Laminate material 800 can be used to hold small personal effects, including but not limited to keys, badges, electronic media players, cellular telephones, cameras, video recorders, wallets, credit cards, books, and any combination thereof. Laminate material 800 can also be used to hold together components, such as components of an electronic device. Laminate material 800 can also be used as a functional apparatus for suspending materials such as paintings, mirrors, photographs, light fixtures, etc. Laminate material 800 can also be materials used, alone or in combination, for clothing such as footwear, outwear, hats, drawstrings, belts, shirts, pants etc. Laminate material 800 can also be materials used, alone or in combination, for furniture, carpets, rugs, floor mats, and bedding. The aforementioned examples are merely illustrative.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A lanyard comprising:
    a head comprising:
        a fiber layer comprising a plurality of fibers;
        a first inner adhesive layer coupled to a first side of the fiber layer;
        a first scrim layer coupled to the first inner adhesive layer;
        a first outer adhesive layer coupled to the first scrim layer;
        a second inner adhesive layer coupled to a second side of the fiber layer;
        a second scrim layer coupled to the second inner adhesive layer; and
        a second outer adhesive layer coupled to the second scrim layer; and
    a body comprising:
        an outer cover layer coupled to the first scrim layer and the second scrim layer and forming a loop of the lanyard configured to attach to a user; wherein
    the head defines an opening that extends through the first scrim layer, the fiber layer, and the second scrim layer.

2. The lanyard of claim 1, wherein the plurality of fibers are comprised of a high strength material.

3. The lanyard of claim 1, wherein the fiber layer comprises untwisted Vectran, RTM, or yarn.

4. The lanyard of claim 1, wherein the fiber layer comprises at least one of aramid fibers, xylow, nitinol, and steel.

5. The lanyard of claim 1, wherein the fiber layer, the first inner adhesive layer, the second inner adhesive layer, the first scrim layer, the second scrim layer, the first outer adhesive layer, and the second outer adhesive layer are coupled to a base layer that itself is coupled to the outer cover layer.

6. The lanyard of claim 1, further comprising at least one additional scrim layer coupled to the first scrim layer.

7. A lanyard comprising:
    a body forming a loop configured to attach the lanyard to a user, the body comprising:
        an inner cover layer;
        at least one inner adhesive layer coupled to the inner cover layer; and
        an outer cover layer coupled to the at least one inner adhesive layer such that the at least one inner adhesive layer is enclosed by the inner cover layer and the outer cover layer; and
    a head comprising:
        a first outer scrim layer coupled to the inner cover layer;
        a fiber layer coupled to the first outer scrim layer; and
        a second outer scrim layer coupled to the fiber layer; wherein:
        the outer cover layer, "the first, outer scrim layer, the second outer scrim layer", and the fiber layer cooperate to define an opening; and
        the inner cover layer is coupled to the first outer scrim layer and the second outer scrim layer so as to form an inner surface of the body.

8. The lanyard of claim 7, further comprising a base layer coupled to the inner cover layer.

9. The lanyard of claim 7, wherein at least one of the inner cover layer and the outer cover layer comprises at least one of:
    Vectran;
    Kevlar;
    aramid fibers;
    xylow;
    nitinol; or
    steel.

10. The lanyard of claim 7, wherein the body forms a substantially planar sheet.

* * * * *